United States Patent

[11] 3,550,956

[72] Inventor John J. Lowe
 South Hill, Va.
[21] Appl. No. 859,520
[22] Filed July 24, 1969
 Continuation of Ser. No. 682,743,
 Nov. 14, 1967, abandoned.
[45] Patented Dec. 29, 1970
[73] Assignee Burlington Industries, Inc.
 Greensboro, N.C.
 a corporation of Delaware

[54] SAFETY WEBBING
 1 Claim, 1 Drawing Fig.
[52] U.S. Cl................................................. 297/385,
 139/383, 139/420
[51] Int. Cl..................................................... A47c 3/00

[50] Field of Search.............................................. 24/77;
 297/385; 139/383, 384, 420, 426; 57/139, 140

[56] References Cited
 UNITED STATES PATENTS
 2,309,564 1/1943 Anderson et al.............. 57/139
 2,324,583 7/1943 Jackson........................ 57/139
 3,196,509 7/1965 Frew ............................ 24/77
 3,322,163 5/1967 Hughes......................... 139/383

Primary Examiner—Henry S. Jaudon
Attorney—Cushman, Darby and Cushman

ABSTRACT: Woven safety webbing for use in automobile seat belts or the like characterized by increased abrasion resistance. The webbing comprises, as the warp yarn, plied yarn made up of two or more ends of singles yarn, the ply twist being in the same direction as the twist in the singles before plying.

PATENTED DEC29 1970
3,550,956
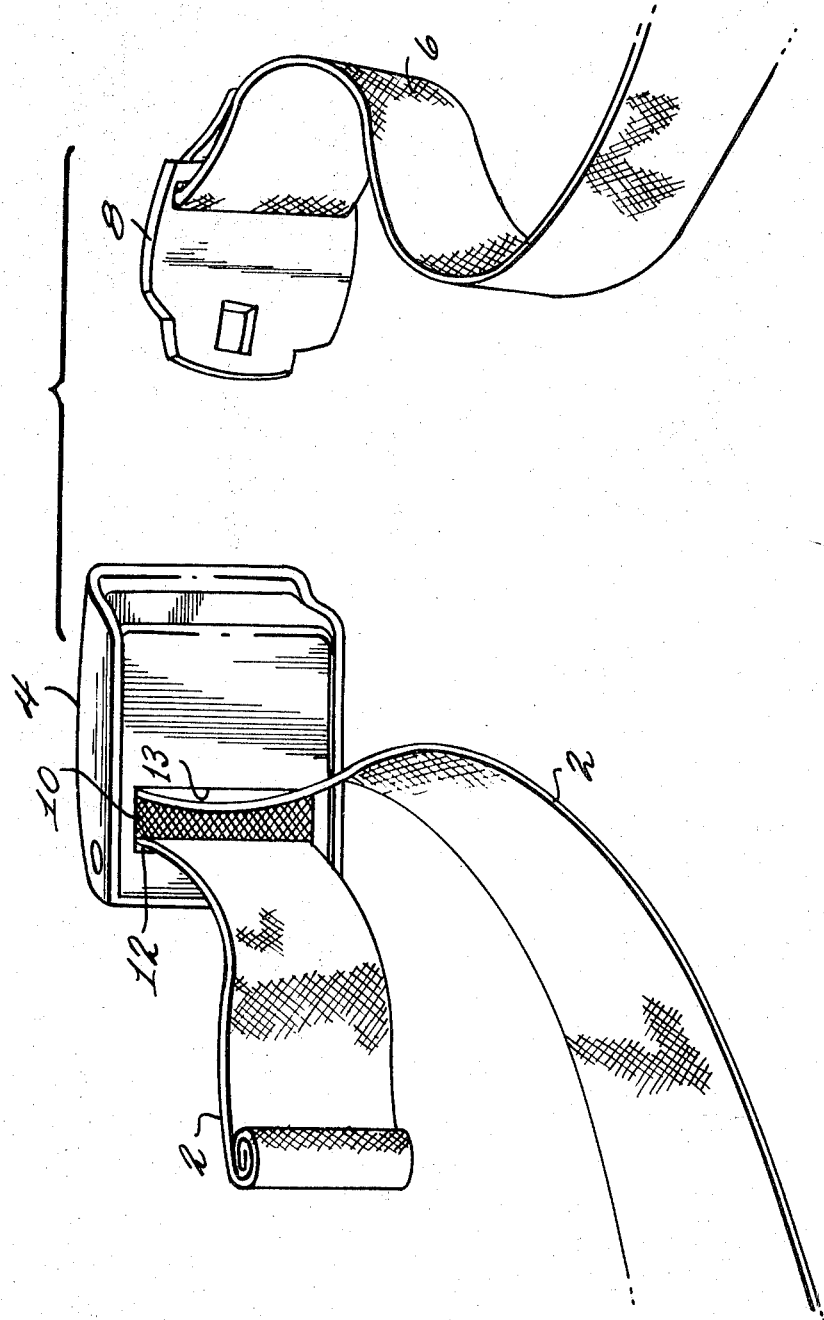
INVENTOR
JOHN J. LOWE
BY Cushman Darby & Cushman
ATTORNEYS

SAFETY WEBBING

This is a continuation of application Ser. No. 682,743, Nov. 14, 1967 now abandoned.

The present invention is concerned with the provision of woven safety webbing which demonstrates highly improved surface abrasion resistance. The woven webbing of the invention is particularly useful for automotive safety restraint systems although other uses where surface abrasion resistance in webbing is important are also contemplated.

Safety webbing presently used for seat belts has relatively low resistance to surface abrasion. For instance, in the adjustable buckle-type of safety restraint system, abrasion normally occurs after the user snaps the belt buckle shut and then either tightens or loosens the belt through the adjustable feature of the buckle. After about 200 such cycles, the cumulative abrasion effect results in a thickening of the webbing, making it increasingly more difficult to pull the webbing through the buckle. In one particular type of buckle construction now in substantial use, the webbing must be pulled over a buckle bar and then through a slot in the back of the buckle proper, and this causes substantial abrasion, the webbing being abraded on one side as it is drawn over the buckle bar and then on the other side as it passes over the edge of the slot in the back of the buckle.

The principal object of the present invention is to provide a convenient and effective solution to the problem of abrasion in automotive or like safety webbing. Other objects will also be apparent from the following detailed description of the invention.

Broadly stated, the present invention is based on the finding that a webbing of remarkably higher surface abrasion resistance is obtained if the webbing is woven with a plied yarn made up of two or more ends of singles yarn, the ply twist being in the same direction as the twist in the singles before plying. Highly useful webbings of increased surface abrasion resistance may be made according to the invention, using a ply yarn of the above type as the warp yarn with conventional safety webbing yarn in the filling. However, if desired, both the filling and warp may be plied yarns of the type indicated.

Use of a plied yarn having a ply twist in the same direction as the twist in the singles before plying (referred to herein for convenience as a "twist-on-twist" plied yarn) represents a marked departure from conventional thinking in the art and the improved abrasion resistance thus obtained is very surprising. In conventional practice, the yarn used for automotive (or other vehicles) safety webbing is a plied yarn (e.g. 2 plied ends of 840 denier nylon yarn) but the ply twist is opposed to any twist in the preplied ends. Thus, for example, the singles as recieved from the yarn manufacturer has a twist of about one-half turn in the Z direction and they are then plied together for use by twisting 2½ turns in the opposite direction (i.e. with S twist). This is consistent with usual practice in the art in that the use of a ply twist which is opposed to the singles twist will result in a more balanced yarn condition with any tendency for the singles to untwist in one direction being at least partially offset by the tendency for the plied yarn to untwist in the opposite direction.

The amount of ply and preply twist in the yarns employed herein, according to the present invention, may be widely varied although it appears that the degree of abrasion resistance in the webbing is very measurably increased as the number of ply turns are increased. Usually, the preply twist in the singles will be in the range of one-fourth to three turns per inch in either the S or Z direction although amounts of singles twist outside this range may also be used. The ply twist may also ver varied but usually will fall in the range of 2—10 turns per inch in the same direction as the singles twist. Ply twists outside the indicated range may be used depending on the denier of the yarn and other factors although in the case of the plied yarn as well as the preplied singles, it is generally preferred for ease of handling to stay below the point where the yarn becomes too lively.

Two or more ends of yarn (for example three or four) may be plied together for present purposes. Typically, two ends of 840 denier or other heavy denier nylon yarn plied together as described are used as the warp and the same or different yarn, e.g. singles 840 denier nylon or conventional two-ply, 840 nylon yarn, may used as the filling.

Apart from the use of a plied yarn of the type indicated (i.e. ply twist in the same direction as singles twist) as the warp and, optionally, as the filling, the safety webbings of the invention may be of conventional construction. Thus, the number of warp and filling ends may be widely varied although usually the warp and filling ends will run about 220—300 per webbing (based on a normal 1 15/16 inch width webbing) and 14—20 per inch, respectively. Typically, the webbing is 1 15/16 inches wide as indicated although this may be varied if desired. The construction employed is preferably a multipanel twill weave but other safety webbing weaves may also be used. Usually, the yarn prior to plying (i.e. in the singles state) is 840 denier nylon although other sizes and types of yarn, or combinations thereof, may be used. One representative construction is a 2 by 2 four-way twill weave comprising, as the warp, 256 ends of two-ply 840 denier nylon, the singles in each end having one-half turn Z producer twist and the plied ends having 3½ turns ply twist also in the Z direction. The filling yarn (typically 15 picks per inch) may be, for example, a two-ply 840 denier nylon yarn (producer twist one-half turn Z and ply twist 2½ turns S). The nylon may be any conventional type, e.g. nylon 6 or 66.

Another example of a safety webbing according to the invention is a 2 by 2 three-way twill woven with 264 ends of two-ply 840 denier nylon as the warp, the ply twist (6 turns) being in the same direction Z as the preply producer's twist one-half turn) in the 840 denier nylon. This latter construction may include 15 picks per inch of two-ply 840 denier or other heavy denier nylon in the filling, the ply twist (2½ turns) being opposed S to the twist in the singles. Other safety webbing constructions are also contemplated as will be apparent. For instance, some or all of the nylon warp or filling ends referred to in the above described constructions may be replaced by polyester or other yarns. For purposes of identification or otherwise, the webbing may include a small number of warp ends, e.g. two or more, in singles form a plied with a twist different from the ply twist in the main body of warp ends.

The unique advantages of the present safety webbing are shown by the following test results comparing conventional automotive safety webbings with webbings of the present invention. The test employed involved pulling the webbings through a conventional safety belt buckle for 6 inches in one direction and then 6 inches in the other direction to complete one full cycle. The only difference between the webbings compared was that in the webbings representative of the invention, the warp yarn was a "twist-on-twist" plied yarn whereas, in the construction representative of conventional practice, the warp yarn was a plied yarn with the ply twist opposed to the preply twist. Each webbing was woven of 264 ends and 15 picks per inch. Two such webbings (each 1 15/16 inches wide) were woven, according to the invention, the first with two-ply 840 denier nylon yarn with 3½ turns per inch Z ("twist-on-twist," each single end having one-half turn Z producer) as the warp yarn and the second with a similar warp yarn except that the latter had six turns per inch Z-ply twist. In both cases, the filling yarn was two-ply 840 denier nylon yarn with 2½ turns S-ply twist. For comparison, a similar webbing was prepared except that, in this instance, the warp yarn was two-ply 840 denier nylon (2½ turns S-ply twist). This construction is typical of an automotive safety webbing now in use.

The three test webbings mentioned in the preceding paragraph were tested for surface abrasion resistance by repeated drawing of the same through a conventional automotive safety belt buckle in the manner referred to above. Abrasion became evident after about 100 cycles on the conventional webbing and after 400 cycles the webbing became os thick due to abrasion that it was extremely difficult to pass the same through the buckle. In contrast, the webbing of the invention made with the 3½ turns ply twist warp yarn showed no measurable evidence of abrasion after 400 cycles and demonstrated much less abrasion even after 1,500 cycles than the conventional webbing did at 400 cycles. The webbing made with the six turns ply twist warp yarn had even greater abrasion resistance and showed no significant abrasion even after 10,000 test cycles.

The accompanying drawing is a perspective view of a lap-type safety belt with a conventional form of belt buckle, it being understood that this is given only for the sake of illustration since the invention is equally applicable to shoulder harness or torso-type belts or other forms of lap belts or safety restraint systems. As shown, the belt includes the web 2 which carries the buckle 4 and the connecting web 6 with the usual means 8 at its end for locking with cooperating means on the buckle 4. As will be understood, the belt may be tightened by pulling on the end of web 2 so that the web slides over the buckle bar 10 and passes over the edge 12 of the slot 13 in the back of the buckle. The resultant chafing of the web 2 with the bar 10 and edge 12 causes some of the objectionable abrasion in conventional webbings. Similar chafing and resultant abrasion occur when the belt is loosened for subsequent use. This undesired abrasion, in adjusting the length of the belt, is obviated with the webbings of the invention.

It will be recognized from the foregoing that various modifications of the invention as described above may be made without deviating from the scope thereof. Thus, as indicated, the invention contemplates use of the present webbing in any form of safety restraint system, (lap, torso or other type) for use in automobiles or other vehicles, e.g. aircraft, wherein one or more webbings are employed. Thus, one form of safety belt according to the invention comprises a woven webbing which carries an adjustable buckle and a second woven webbing having means at one end for locking engagement with the buckle, at least the webbing which carries the buckle and preferably both webbings comprising, as the warp, plied yarn made up of two ro more ends of singles yarn, the ply twist being in the same direction as the twist in the singles before plying. However, broadly speaking, the safety restraint system of the invention will comprise one or more safety webbings and means for adjusting the webbing for safety restraint where manual or automatic adjustment or movement of the webbing tends to induce abrasion, e.g. restraint systems employing inertia or windup reels, buckles and/or other adjusting means.

I claim:

1. A safety restraint system including a woven safety webbing which comprises, as the warp, plied yarn made up of two or more ends of singles yarn of substantially 840 denier nylon, the ply twist being in the same direction as the twist in the singles before plying, wherein the ply twist varies from 2—10 turns per inch and the preply twist is in the range of one-fourth—three turns per inch, the filling including plied yarn wherein the ply twist is opposed to the twist in the singles before plying and wherein the number of warp ends is from 220—300 per 1 15/16 inches webbing and the number of filling ends is from 14—20 per inch, a buckle adjustably carried by said webbing and means at one end of said webbing for locking engagement with said buckle, wherein said webbing is up to 100 times more abrasive resistant than conventional safety restraint webbings.